3,712,891
CHLORINATION OF CYANURIC ACID
Sidney Berkowitz, Highland Park, and Raymond N. Mesiah, Somerset, N.J., assignors to FMC Corporation, New York, N.Y.
No Drawing. Filed July 21, 1971, Ser. No. 164,948
Int. Cl. C07d 55/40
U.S. Cl. 260—248 C    4 Claims

ABSTRACT OF THE DISCLOSURE

This invention provides a process for producing chloroisocyanuric acids by reacting cyanuric acid and hypochlorous acid in an aqueous medium at a temperature of 0° C. to 50° C. The process is capable of producing chloroisocyanuric acids without producing a salt as a co-product of chlorination.

BACKGROUND OF THE INVENTION

(A) Field of the invention

The chloroisocyanuric acids, sometimes referred to as chlorocyanuric acids, are chemicals having many known uses. This invention provides a novel process for chlorinating cyanuric acid to produce these useful chemicals.

(B) Description of the prior art

Dichloroisocyanuric acid and trichloroisocyanuric acid have been produced by mixing cyanuric acid with sodium hydroxide and then chlorinating by the addition of chlorine.

Specifically, dichloroisocyanuric acid has been produced by mixing cyanuric acid with sodium hydroxide in a mole ratio of 1 part cyanuric acid to 2 parts sodium hydroxide and then chlorinating by the addition of chlorine, usually in two stages, until the pH is between 1.7 and 3.5. After chlorination a slurry containing dichloroisocyanuric acid as a precipitate is filtered and the dichloroisocyanuric acid filter cake is usually washed and dried.

All prior art processes for chlorinating cyanuric acid employ a base, usually sodium hydroxide, which results in the chloroisocyanuric acid product being obtained as a solid precipitate in the mother liquor which also contains a salt, usually sodium chloride, as a product. The presence of salt in the mother liquor interferes with recovering the chloroisocyanuric acid values by recycling the mother liquor.

The prior art process of mixing cyanuric acid with sodium hydroxide to produce disodium cyanurate and then reacting the latter with chlorine results in an exothermic reaction and produces a slurry from which large quantities of heat must be removed. Removing this heat presents difficult process engineering problems when the process is operated continuously to produce commercial quantities. Because of the nature of the slurry involved, heat exchangers used to control temperatures in the reactor frequently plug during operation and require numerous shutdowns for cleaning. During these shutdowns, some of the cyanuric acid values present in the slurry hydrolyze forming ammonia and carbon dioxide. The presence of ammonia in the slurry cannot be permitted because it leads to formation of highly explosive nitrogen trichloride during subsequent chlorination. As a result, all of the slurry must be discarded if a prolonged shutdown (several hours) takes place and such discarding of reactants and products represents not only an undue economic loss but also a difficult disposal problem.

In addition to the operating difficulties, the prior processes require long hold-up times for the chlorination reaction to approach completion and therefore the reactors must be relatively large in order to obtain sufficient hold-up time.

SUMMARY OF THE INVENTION

Chloroisocyanuric acids, especially very pure dichloroisocyanuric and trichloroisocyanuric acid, are produced by the process of this invention by reacting cyanuric acid and hypochlorous acid in an aqueous medium at a temperature of 0° to 50° C., and preferably below about 25° C. The molar ratio of cyanuric acid to hypochlorous acid is preselected to yield a product having the desired degree of chlorination. This process eliminates the large multiple-stage reactors and the heat removal and shutdown problems associated with the prior art process. Furthermore, high yields of chloroisocyanuric acids can be continuously obtained in commercial quantities employing only a relatively small, single stage reactor because the chlorination reaction is relatively fast in comparison to the prior art process, thereby eliminating the need for long hold-up times for the reactants.

The chloroisocyanuric acid produced by this process is obtained as a precipitate in a mother liquor while some chloroisocyanuric acid remains dissolved in the mother liquor. This dissolved chloroisocyanuric acid can be conveniently recovered by recycling the mother liquor without interfering with the chlorination reaction because the mother liquor need not contain sodium chloride or other salts which interfere with chlorination since salts are not formed as co-products of the chlorination reaction. This is a significant advantage over prior art processes which employ an alkali as a reactant with the result that a corresponding salt is produced in the mother liquor.

DETAILED DESCRIPTION OF THE INVENTION

This invention provides a novel process for producing chloroisocyanuric acids by reacting cyanuric acid and hypochlorous acid. The process obtains high yields employing a single stage reactor, requires relatively short reaction times and can produce the chloroisocyanuric acid product in a mother liquor without the presence of sodium chloride or similar salts. Furthermore, the amount of heat evolved from this chlorination reaction is significantly less than the amount of heat evolved by the prior process of reacting cyanuric acid, sodium hydroxide and chlorine. These significant process advantages over the prior art permit the process to continuously obtain high yields in commercial quantities employing a single small reactor with direct recycling of the mother liquor after product separation.

The reaction temperature can vary between 0° and 50° and preferably is maintained below 25° C. The best mode contemplated for practicing this invention, which provides the highest yields, is with a reaction temperature of between 10° and 15° C.

The hypochlorous acid reactant is preferably introduced as an aqueous hypochlorous acid solution having a pH between about 4 and about 4.5. Hypochlorous acid solutions having pH's outside the preferred range of 4 to 4.5 can be used. However, their commercial usefulness decreases as the pH of the hypochlorous acid deviates from the preferred range. This is due to the decrease in hypochlorous acid stability and concentration as the pH of the hypochlorous acid solution deviates from the preferred range of 4 to 4.5. Hypochlorous acid solutions having a pH higher than 5.0 or lower than 3.5 tend to be uneconomical although they are operable.

A significant characteristic of this process not provided by any of the prior art processes, is that the residence time in the reactor required for the reaction to reach substantial completion is very short. High, commercially valuable yields are obtained with residence times in the reactor between about 1 to 10 minutes. The best mode contemplated for practicing this invention is with residence times of less than about 10 minutes, preferably 1 to 3 minutes. The combination of high yields, short residence times and the ability to operate with a single stage process results in a commercial process which can employ a single, small, pipe-like reactor with high throughput (short residence times). This eliminates most of the heat removal and operating problems of the prior processes along with a substantial reduction in the amount of capital equipment needed.

The mole ratio of cyanuric acid to hypochlorous acid fed into the reaction zone determines the degree of chlorination of the chloroisocyanuric acid product. A mole ratio of cyanuric acid to hypochlorous acid of about 1:2 gives high yields of essentially pure dichloroisocyanuric acid while a mole ratio of about 1:3 gives high yields of essentially pure trichloroisocyanuric acid. Mole ratios of between about 1:2 and about 1:3 yield a product mixture of di- and tri-chloroisocyanuric acids.

The basic process provided by this invention employs hypochlorous acid directly as a reactant. However, the process can be modified and improved for certain uses by preparing hypochlorous acid in situ. This is accomplished by replacing the hypochlorous acid solution with reactants which will produce a hypochlorous acid solution. Examples of reactions and their associated reactants that will produce hypochlorous acid in situ are:

(a) acidification of sodium hypochlorite to a pH of 4.1 to 4.5 to produce hypochlorous acid
(b) chlorination of water in the presence of mercuric oxide (HgO) to produce hypochlorous acid
(c) addition of $Cl_2O$ to water to produce hypochlorous acid.

The following examples are provided by way of illustration only and are not intended to limit the scope of the invention. All percentages used herein are weight percentages unless otherwise specified.

EXAMPLE 1

A reactor consisting of a 250 ml. beaker equipped with a Teflon paddle stirrer, thermometer and pH electrodes was charged with 85 g. (0.062 mole) of an aqueous hypochlorous acid solution having a pH of 4.1. The acid solution in the reactor was cooled to 10° C. and a slurry containing 3.9 g. (0.0302 mole) of cyanuric acid in 10 ml. of water was added to the reactor. The pH in the reactor dropped from 4.1 to 2.6. The reaction mixture turned clear and then a white precipitate formed. This occurred in about 1–2 minutes. The solids were filtered, washed with 10 ml. of water and dried at 90° C. and a pressure of 20 mm. of mercury. The yield of precipitated product was 5.4 g. (0.0273 mole) of dichloroisocyanuric acid having 71.6% by weight available chlorine (theory for dichloroisocyanuric acid is 71.6%). An additional 0.6 g. (0.0025 mole) of dichloroisocyanuric acid was contained in the filtrate which resulted in a total yield of 98.5% by weight based upon the amount of cyanuric acid feed.

EXAMPLE 2

The same reactor was used as in Example 1. Seventy-eight g. of an aqueous hypochlorous acid solution containing 0.0475 mole of hypochlorous acid was added to the reactor at a temperature of 10° C. A slurry containing 2.0 g. (0.0155 mole) of cyanuric acid in 10 ml. of water was added to the hypochlorous acid solution. The pH dropped from 4.1 to 2.6. After 1–2 minutes, the product precipitated and was filtered, washed with 10 ml. of water and dried, yielding 3.0 g. (0.0130 mole) of trichloroisocyanuric acid having 90.1% by weight available chlorine (theory for trichloroisocyanuric acid is 91.5%). Another 0.04 g. of trichloroisocyanuric acid was contained in the filtrate which resulted in an overall yield of 95% based on the weight of cyanuric acid feed.

EXAMPLE 3

A reactor was used consisting of a 600 ml. beaker equipped with a Teflon paddle stirrer, thermometer, gas sparger and pH electrodes. The reactor was cooled by means of a brine bath. A solution of 16.85 g. (0.42 mole) of sodium hydroxide in 200 ml. of water was added to the reactor, cooled to 10° C. and chlorinated to a pH of 10.1 which resulted in the conversion of the sodium hydroxide into sodium hypochlorite. A 20% by weight sulfuric acid solution was then rapidly added with cooling to the sodium hypochlorite solution in the reactor until the pH dropped to 4.1. This resulted in the formation of hypochlorous acid. A slurry of 12.9 g. of cyanuric acid and 35 ml. of water was then added to the reactor. This caused the pH to fall from 4.1 to 2.6. With the reaction mixture being stirred, the pH remained constant at 2.6 after about 1 minute. After 2–3 minutes with the reactor contents at a pH of 2.6, the contents were filtered and the solids recovered, washed and dried. The solid product amounted to 17.8 g. (0.0893 mole) of dichloroisocyanuric acid having 70.9% by weight available chlorine. The filtrate contained an additional 1.5 g. (0.0076 mole) of dichloroisocyanuric acid resulting in an overall yield of 97% by weight dichloroisocyanuric acid based upon the amount of cyanuric acid feed.

The best mode contemplated for practicing this invention comprises continuously reacting cyanuric acid and hypochlorous acid under process conditions such that the reaction reaches substantial completion in less than 10 minutes, for example at a reaction temperature of between 10° C. and 15° C., reacting a hypochlorous acid solution having a pH of between 4.1 and 4.5 with cyanuric acid and obtaining an aqueous mother liquor containing a chloroisocyanuric acid product without the presence of salts, the product is separated from the motor liquor and resulting mother liquor is recycled back to the reaction according to standard recycling techniques.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

What is claimed is:
1. A process for producing chloroisocyanuric acids comprising reacting cyanuric acid and hypochlorous acid in an aqeous medium at a temperature of 0° to 50° C. to produce a chloroisocyanuric acid precipitate in an aqueous mother liquor.
2. The process of claim 1 in which the hypochlorous acid is introduced as an aqueous solution having a pH between 4.1 and 4.5.
3. The process of claim 1 in which the cyanuric acid and hypochlorous acid are present in a mole ratio of cyanuric acid to hypochlorous acid of from about 1:2 and dichloroisocyanuric acid is produced.
4. The process of claim 1 in which the cyanuric acid and hypochlorous acid are present in a mole ratio of cyanuric acid and hypochlorous acid of about 1:3 and trichloroisocyanuric acid is produced.

References Cited

UNITED STATES PATENTS 3,108,079  10/1963  Wixon _____ 260—248 X
3,178,429  4/1965  Vazopolos _____ 260—248

JOHN M. FORD, Primary Examiner